US008479594B2

(12) United States Patent
Hsieh

(10) Patent No.: US 8,479,594 B2
(45) Date of Patent: Jul. 9, 2013

(54) APPARATUS AND METHOD FOR MEASURING SLIP RESISTANCE OF WRENCH AND APPARATUS FOR MEASURING ROUNDNESS OF THREADED FASTENER

(75) Inventor: Chih-Ching Hsieh, Taichung County (TW)

(73) Assignee: Chihching Hsieh, Taichung County (TW)

(*) Notice: Subject to any disclaimer, the term of this patent is extended or adjusted under 35 U.S.C. 154(b) by 310 days.

(21) Appl. No.: 12/725,455

(22) Filed: Mar. 17, 2010

(65) Prior Publication Data
US 2011/0154916 A1 Jun. 30, 2011

(30) Foreign Application Priority Data

Dec. 31, 2009 (TW) .............................. 98146507 A

(51) Int. Cl.
G01L 5/24 (2006.01)

(52) U.S. Cl.
USPC ..................................................... 73/862.21

(58) Field of Classification Search
USPC ........................................ 73/862.21–862.23
See application file for complete search history.

(56) References Cited

U.S. PATENT DOCUMENTS

| 3,903,764 | A | * | 9/1975 | Andersen | ..................... | 81/121.1 |
| 4,621,738 | A | * | 11/1986 | DeLucchi | ..................... | 211/70.6 |
| 4,941,570 | A | * | 7/1990 | Kruger et al. | ................. | 206/267 |
| 5,743,395 | A | * | 4/1998 | Backer | ......................... | 206/378 |
| 7,210,578 | B2 | * | 5/2007 | Tuan-Mu et al. | ............. | 206/378 |

* cited by examiner

Primary Examiner — Andre Allen
Assistant Examiner — Octavia Davis-Hollington
(74) Attorney, Agent, or Firm — CKC & Partners Co., Ltd.

(57) ABSTRACT

An apparatus for measuring the slip resistance of a wrench includes a base, at least one first threaded fastener, and at least one second threaded fastener. Both the first threaded fastener and the second threaded fastener are threaded into the base, wherein the roundness of the first threaded fastener and the roundness of the second threaded fastener are different.

22 Claims, 4 Drawing Sheets

APPARATUS AND METHOD FOR MEASURING SLIP RESISTANCE OF WRENCH AND APPARATUS FOR MEASURING ROUNDNESS OF THREADED FASTENER

RELATED APPLICATIONS

This application claims priority to Taiwan Patent Application Serial Number 98146507, filed Dec. 31, 2009, which is herein incorporated by reference.

BACKGROUND

1. Field of Invention

The present disclosure relates to measuring systems.

2. Description of Related Art

Threaded fasteners, such as screws, bolts, nuts, are commonly found in is general machinery equipments, electrical products, or even buildings. In use, the user may use hand tools such as wrenches to turn the threaded fasteners.

However, the heads of the threaded fasteners may be rounded after several turning operations. General wrenches cannot provide enough grips in applying torque to turn the threaded fasteners with rounded heads. As a result, the threaded fasteners with the rounded heads will be stuck in the workpiece and cannot be removed from the workpiece by usual way.

Although many manufacturers allege their anti-slip wrenches or sockets can solve this problem, there is no objective test to determine the slip resistance of a wrench or socket. Therefore, consumers tend to get lost in all the hype and advertisements for the anti-slip wrenches or sockets and cannot find an effective product.

SUMMARY

According to one embodiment of the present disclosure, an apparatus for measuring the slip resistance of a wrench includes a base, at least one first threaded fastener, and at least one second threaded fastener. The first threaded fastener is threaded into the base. The second threaded fastener is threaded into the base, wherein the roundness of the first threaded fastener and the roundness of the second threaded fastener are different.

According to another embodiment of the present disclosure, a method for measuring the slip resistance of a wrench includes the following steps. A base having at least one threaded fastener threaded therein is provided. Whether the wrench can turn the threaded fastener is determined. The slip resistance of the wrench is determined according to the roundness of the threaded fastener when the wrench can turn the threaded fastener.

The foregoing steps are not recited in the sequence in which the steps are performed. That is, unless the sequence of the steps is expressly indicated, the sequence of the steps is interchangeable, and all or part of the steps may be simultaneously, partially simultaneously, or sequentially performed.

According to yet another embodiment of the present disclosure, an apparatus for measuring the roundness of a threaded fastener includes a base, at least one indentation, a bottom plate, and a measure. The indentation is located in the base. The bottom plate is located at the bottom of the indentation. The measure is located on the bottom plate for determining the measurement of the roundness of the threaded fastener.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
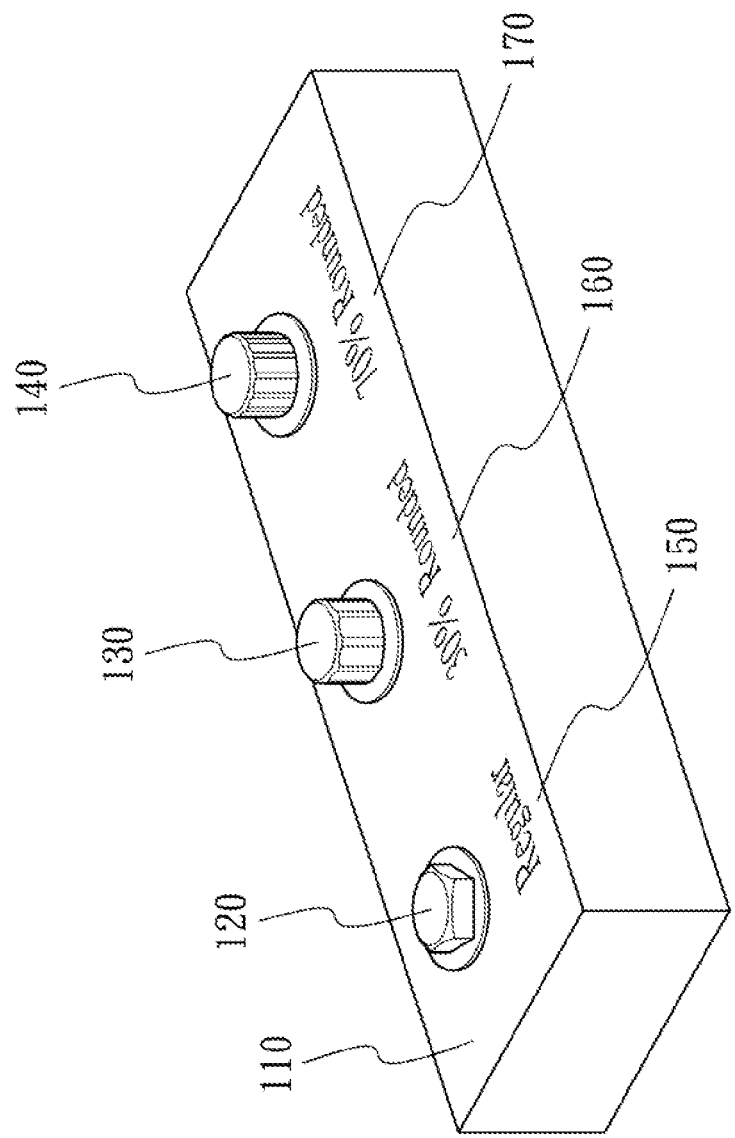
FIG. 1 is a three dimensional view of an apparatus for measuring the slip resistance of a wrench according to one embodiment of the present disclosure.

FIG. 1 is a three dimensional view of an apparatus for measuring the slip resistance of a wrench according to one embodiment of the present disclosure.

The apparatus for measuring the slip resistance of the wrench includes a base 110, at least one first threaded fastener 120, and at least one second threaded fastener 130. The first threaded fastener 120 is threaded into the base 110. The second threaded fastener 130 is threaded into the base 110, wherein the roundness of the first threaded fastener 120 and the roundness of the second threaded fastener 130 are different.

In use, wrench salesmen can thread the first threaded fastener 120, e.g. a normal bolt, and the second threaded fastener 130, e.g. a bolt with a 30% rounded head, into the base 110. Then, the wrench salesmen may remove the first threaded fastener 120 and the second threaded fastener 130 from the base 110 by the wrench they sell. In this way, the wrench salesmen can demonstrate the slip resistance of the wrench they sell to consumers.

The apparatus for measuring the slip resistance of the wrench may further include at least one third threaded fastener 140, e.g. a bolt with a 70% rounded head, threaded into the base 110. The first threaded fastener 120, the second threaded fastener 130, and the third threaded fastener 140 are arranged according to their roundness.

In use, the wrench salesmen may remove the first threaded fastener 120, the second threaded fastener 130, and the third threaded fastener 140 from the base 110 in order by the wrench they sell. In this way, the wrench salesmen can demonstrate that the wrench they sell can turn the threaded fasteners with different roundnesses.

The first threaded fastener 120, the second threaded fastener 130, and the third threaded fastener 140 can be any objects capable of being turned by a wrench. In one or more embodiments of the present disclosure, the first threaded fastener 120, the second threaded fastener 130, and the third threaded fastener 140 can be screws, bolts, nuts, or combinations thereof.

The wrench can be any tool capable of turning objects. In one or more embodiments of the present disclosure, the wrench can be an open-end wrench, a box-end wrench, a combination wrench, a flare-nut wrench, an adjustable wrench, a ratcheting wrench, a socket wrench, a socket, a torque wrench, a crowfoot wrench, a saltus wrench, a box spanner, a striking face box wrench, or combinations thereof. It is noted that the term "wrench" may refer to a socket only, i.e. a socket of a socket wrench that has not been attached to a handle.

In one or more embodiments of the present disclosure, the apparatus for measuring the slip resistance of the wrench may further include at least one first label 150, at least one second label 160, and at least one third label 170. The first label 150, the second label 160, and the third label 170 are respectively disposed adjacent to the first threaded fastener 120, the second threaded fastener 130, and the third threaded fastener 140 for marking the roundnesses of the first threaded fastener 120, the second threaded fastener 130, and the third threaded fastener 140.

In FIG. 1, the first label 150 is "Regular", which represents the first threaded fastener 120 is a standard threaded fastener which has not been worn yet. The second label 160 is "30% Rounded", which represents the roundness of the second threaded fastener 130 is 30%. The third label 170 is "70% Rounded", which represents the roundness of the third threaded fastener 140 is 70%.

Figure 2:
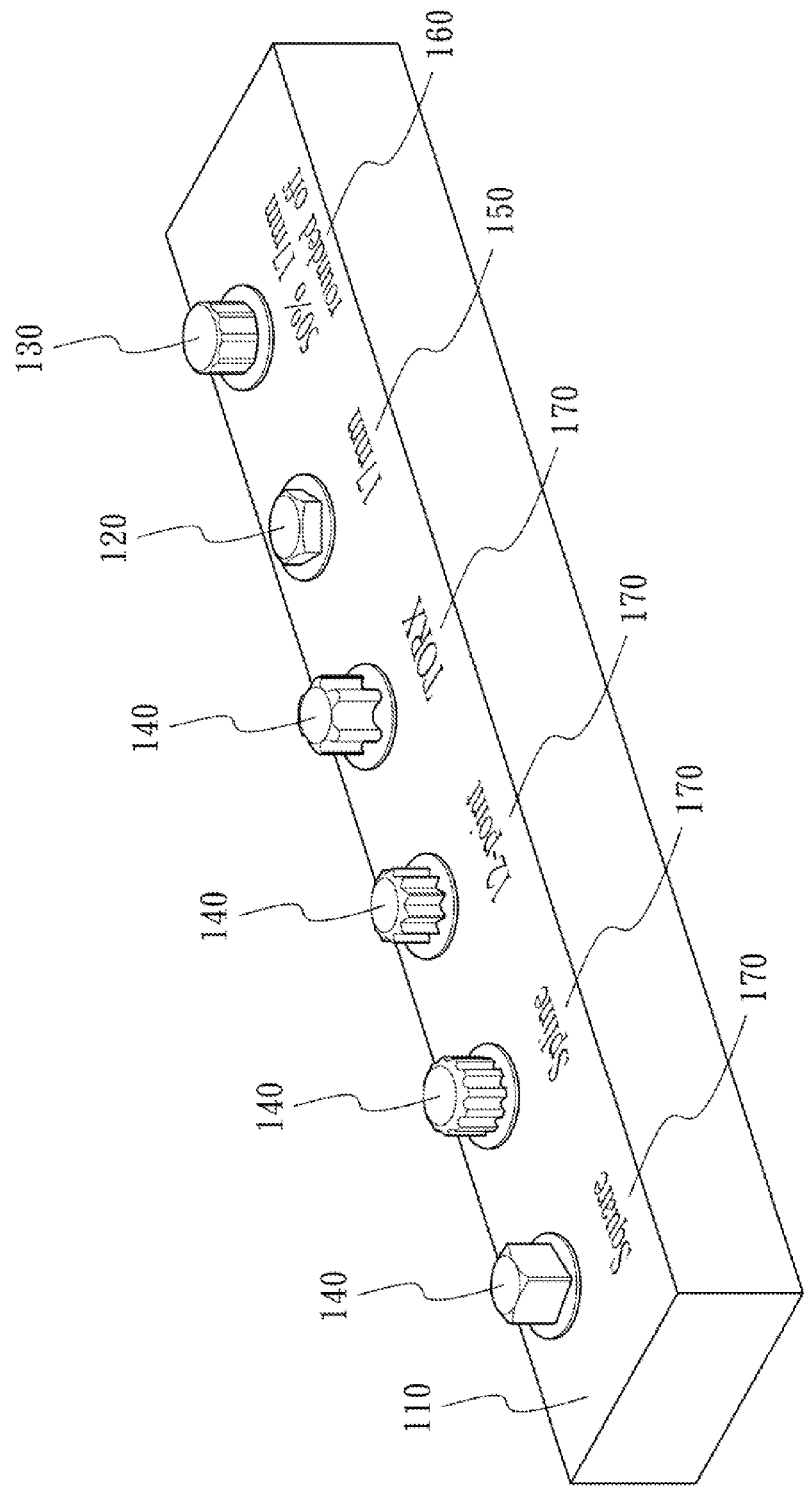
FIG. 2 is a three dimensional view of an apparatus for measuring the slip resistance of a wrench according, to another embodiment of the present disclosure.

FIG. 2 is a three dimensional view of an apparatus for measuring the slip resistance of a wrench according to another embodiment of the present disclosure. The difference between the apparatuses of FIG. 2 and FIG. 1 is: the first threaded fastener 120 and the third threaded fastener 140 of FIG. 2 have different head shapes.

There are some commercial wrenches which can turn threaded fasteners with different head shapes. To demonstrate the performance of the wrench, there may be a plurality of the third threaded fasteners 140 with different head shapes threaded into the base 110. For example, the third threaded fasteners 140 of FIG. 2 include a TROX head threaded fastener, a 12-point threaded fastener, a spline threaded fastener, and a square threaded fastener. In use, the wrench salesmen can turn the third threaded fasteners 140 by the wrench they sell, thereby showing the performance of the wrench.

Another aspect of the present disclosure is a method for measuring the slip resistance wrench. The followings will disclose a plurality of embodiments to illustrate how to perform the slip resistance measuring method. The structural and functional details described before are not repeated hereinafter, and only further information is supplied to perform the slip resistance measuring method.

According to one embodiment of the present disclosure, a method for measuring the slip resistance of a wrench includes the following steps. A base having at least one threaded fastener threaded therein is provided. Whether the wrench can turn the threaded fastener is determined. The slip resistance of the wrench is determined according to the roundness of the threaded fastener when the wrench can turn the threaded fastener.

The foregoing steps are not recited in the sequence in which the steps are performed. That is, unless the sequence of the steps is expressly indicated, the sequence of the steps is interchangeable, and all or part of the steps may be simultaneously, partially simultaneously, or sequentially performed.

The term "slip resistance" means the ability to turn a threaded fastener with a rounded head. That is, the wrench has good slip resistance if the wrench can turn a threaded fastener with a seriously rounded head. On the other hand, the wrench has poor slip resistance if the wrench can only turn a threaded fastener with a regular head.

For example, in FIG. 1, the user may try to turn the first threaded fastener 120 (regular), the second threaded fastener 130 (30% rounded), and the third threaded fastener 140 (70% rounded) by a wrench in order. If the user can only turn the first threaded fastener 120 and the second threaded fastener 130 and cannot turn the third threaded fastener 140, the slip resistance of the wrench is "success in turning 30% rounded threaded fasteners".

Figure 3:
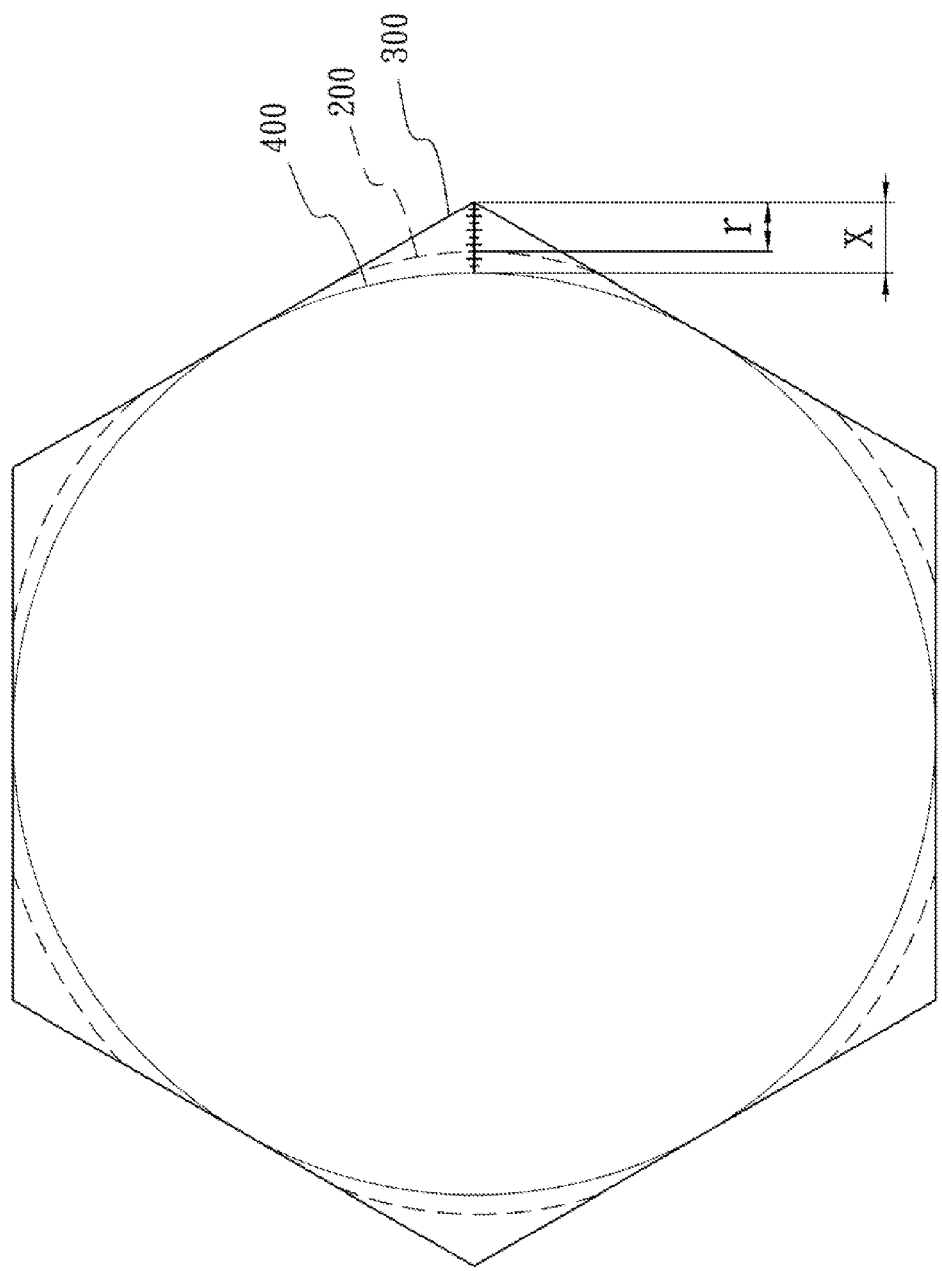
FIG. 3 is a plan view of the roundness of a threaded fastener according to one embodiment of the present disclosure.

FIG. 3 is a plan view of the roundness of a threaded fastener according to one embodiment of the present disclosure. The roundness of a threaded fastener is calculated by the following formula I.

$$M = r/X \times 100\% \qquad \qquad I$$

M represents the roundness of the threaded fastener 200. r represents the distance between the corner of the threaded fastener 200 and the corner of a standard threaded fastener 300 when the threaded fastener 200 maps onto the standard threaded fastener 300. X represents the distance between the corner of the standard threaded fastener 300 and the edge of the incircle 400 of the standard threaded fastener 300.

Yet another aspect of the present disclosure is an apparatus for measuring the roundness of a threaded fastener.

Figure 4:
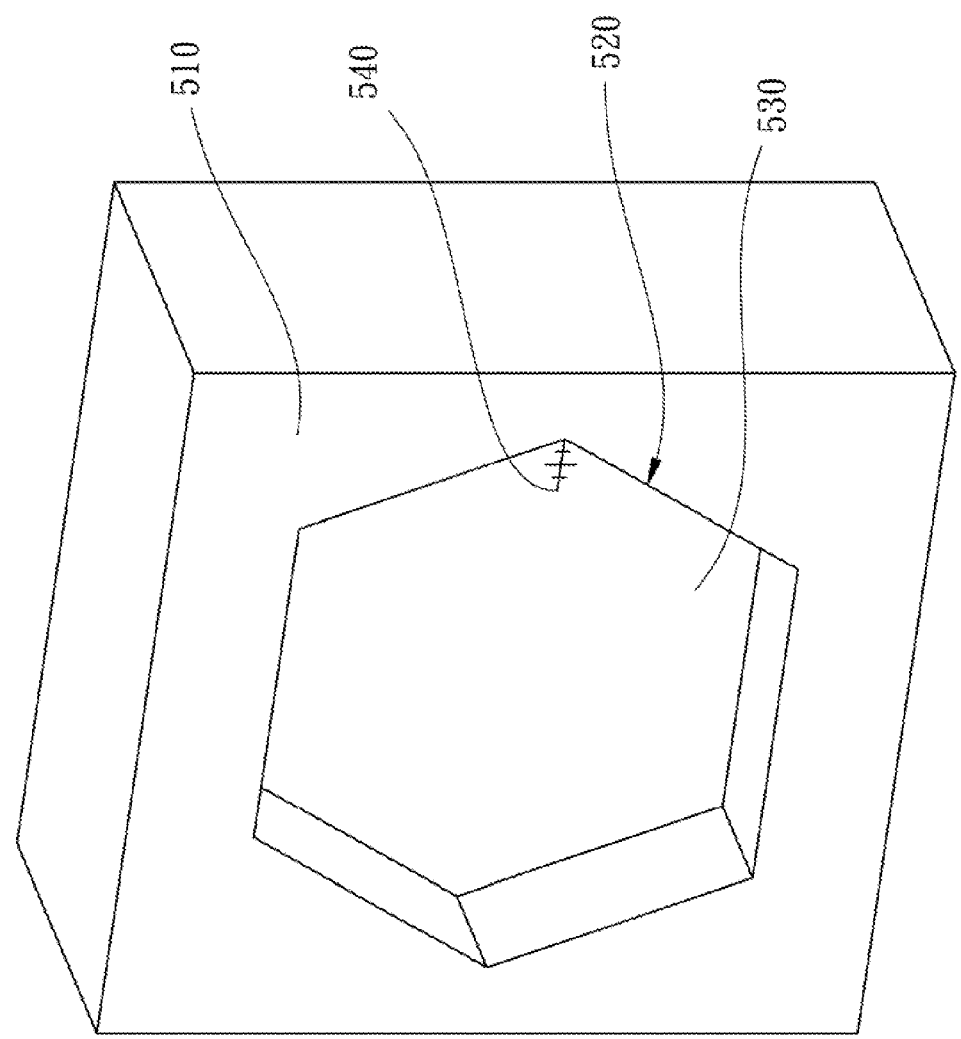
FIG. 4 is a three dimensional view of an apparatus for measuring; the roundness of a threaded fastener according to one embodiment of the present disclosure.

FIG. 4 is a three dimensional view of an apparatus for measuring the roundness of a threaded fastener according to one embodiment of the present disclosure. An apparatus for measuring the roundness of a threaded fastener includes a base 510, at least one indentation 520, a bottom plate 530, and a measure 540. The indentation 520 is located in the base 510. The bottom plate 530 is located at the bottom of the indentation 520. The measure 540 is located on the bottom plate 530 for determining the measurement of the roundness of the threaded fastener.

In use, the user may put the threaded fastener into the indentation 520 and then read the measurement on the measure 540. In this way, the user can find out the roundness of the threaded fastener.

In one or more embodiments of the present disclosure, the bottom plate 530 is transparent. In use, the user may read the measurement on the measure 540 from the back side of the bottom plate 530.

In one or more embodiments of the present disclosure, the bottom plate 530 and the base 510 are made out of one piece. For example, the bottom plate 530 and the base 510 may be made out of one piece of Poly(methyl methacrylate) (PMMA). When manufacturing the measuring apparatus, the manufacturer may provide a block of PMMA and then form the indentation 520 in the block of PMMA by machining.

In one or more embodiments of the present disclosure, the bottom plate 530 has a convex polygon surface, and the measure 540 is located on the convex polygon surface of the bottom plate 530. For example, the bottom plate 530 of FIG. 4 has a hexagonal surface, and the measure 540 is located on the hexagonal surface of the bottom plate 530. Specifically, the measure 540 extends from one of the corners of the convex polygon surface of the bottom plate 530 to the edge of the incircle of the convex polygon surface of the bottom plate 530. The measure 540 has a scale to indicate the roundness of the threaded fastener. One unit on the scale may represent 10% roundness.

In one or more embodiments of the present disclosure, the size of the indentation 520 is substantially the same as the standard size of the threaded fastener. Furthermore, the shape of the indentation 520, in one or more embodiments of the present disclosure, is substantially the same as the standard shape of the threaded fastener.

The terms "substantially" as used herein may be applied to modify any representation which could permissibly vary without resulting in a change in the basic function to which it is related. For example, the size of the indentation 520 as disclosed herein may permissibly be slightly different from the standard size of the threaded fastener within the scope of the invention if its measuring capability is not materially altered.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. An apparatus for measuring the slip resistance of a wrench, the apparatus comprising:
   a base;
   at least one first threaded fastener threaded into the base, wherein the first threaded fastener comprises a head having a height; and
   at least one second threaded fastener threaded into the base, wherein the second threaded fastener comprises a head having a height, and wherein the roundness of the head of the first threaded fastener over the entire height thereof and the roundness of the head of the second threaded fastener over the entire height thereof are different;
   wherein the roundness of the head of the first threaded fastener over the entire height thereof is a function of the distance between a corner of the head of the first threaded fastener and a corner of a head of a standard threaded fastener when the first threaded fastener is mapped onto the standard threaded fastener, and further a function of the distance between the corner of the standard threaded fastener and the edge of an incircle of the standard threaded fastener;
   wherein roundness of the head of the second threaded fastener over the entire height thereof is a function of the distance between a corner of the head of the second threaded fastener and the corner of the head of the standard threaded fastener when the second threaded fastener is mapped onto the standard threaded fastener, and further a function of the distance between the corner of the standard threaded fastener and the edge of the incircle of the standard threaded fastener; and
   wherein the apparatus determines the slip resistance of the wrench according to the roundness of either the first threaded fastener of the second threaded fastener when the wrench can turn the first threaded fastener or the second threaded fastener.

2. The apparatus of claim 1, further comprising:
   at least one first label disposed adjacent to the first threaded fastener for marking the roundness of the first threaded fastener.

3. The apparatus of claim 2, further comprising:
   at least one second label disposed adjacent to the second threaded fastener for marking the roundness of the second threaded fastener.

4. The apparatus of claim 1, wherein the first threaded fastener is selected from the group consisting of a screw, a bolt, a nut, or combinations thereof.

5. The apparatus of claim 4, wherein the second threaded fastener is selected from the group consisting of a screw, a bolt, a nut, or combinations thereof.

6. The apparatus of claim 1, further comprising:
   at least one third threaded fastener threaded into the base, wherein the first threaded fastener, the second threaded fastener, and the third threaded fastener are arranged according to their roundness.

7. The apparatus of claim 1, further comprising:
   at least one third threaded fastener threaded into the base, wherein the first threaded fastener and the third threaded fastener have different head shapes.

8. The apparatus of claim 1, wherein the roundness of the head of the first threaded fastener over the entire height thereof is M, the distance between the corner of the head of the first threaded fastener and the corner of the head of the standard threaded fastener when the first threaded fastener is mapped onto the standard threaded fastener is r, the distance between the corner of the standard threaded fastener and the edge of the incircle of the standard threaded fastener is X, and the following formula is satisfied:

$$M = r/X \times 100\%.$$

9. The apparatus of claim 1, wherein the roundness of the head of the second threaded fastener over the entire height thereof is M, the distance between the corner of the head of the second threaded fastener and the corner of the head of the standard threaded fastener when the second threaded fastener is mapped onto the standard threaded fastener is r, the distance between the corner of the standard threaded fastener and the edge of the incircle of the standard threaded fastener is X, and the following formula is satisfied:

$$M = r/X \times 100\%.$$

10. A method for measuring the slip resistance of a wrench, the method comprising:
    providing a base having at least one threaded fastener threaded therein;
    determining whether the wrench can turn the threaded fastener; and
    determining the slip resistance of the wrench according to the roundness of the threaded fastener when the wrench can turn the threaded fastener.

11. The method of claim 9, wherein a plurality of the threaded fasteners with different roundnesses are threaded in the base.

12. The method of claim 11, wherein the base comprises:
    a plurality of labels arranged adjacent to the threaded fasteners for marking the roundnesses of the threaded fasteners respectively.

13. The method of claim 10, wherein the wrench is an open-end wrench, a box-end wrench, a combination wrench, a flare-nut wrench, an adjustable wrench, a ratcheting wrench, a socket wrench, a socket, a torque wrench, a crowfoot wrench, a saltus wrench, a box spanner, a striking face box wrench, or combinations thereof.

14. The method of claim 10, wherein the wrench is a socket of a socket wrench.

15. An apparatus for measuring the roundness of a threaded fastener, the apparatus comprising:
    a base;
    at least one indentation located in the base;
    a bottom plate located at the bottom of the indentation; and a measure located on the bottom plate for determining the measurement of the roundness of a head of the threaded fastener;

wherein the head of the threaded fastener has a height;

wherein the roundness of the head of the threaded fastener over the entire height thereof is a function of the distance between a corner of the head of the threaded fastener and a corner of a head of a standard threaded fastener when the threaded fastener is mapped onto the standard threaded fastener, and further a function of the distance between the corner of the standard threaded fastener and the edge of an incircle of the standard threaded fastener; and wherein the apparatus determines the roundness of the threaded fastener according to the roundness of the head of the threaded fastener.

16. The apparatus of claim 15, wherein the bottom plate is transparent.

17. The apparatus of claim 15, wherein the bottom plate and the base are made out of one piece.

18. The apparatus of claim 15, wherein the bottom plate has a convex polygon surface, and the measure is located on the convex polygon surface of the bottom plate.

19. The apparatus of claim 18, wherein the measure extends from one of the corners of the convex polygon surface of the bottom plate to the edge of the incircle of the convex polygon surface of the bottom plate.

20. The apparatus of claim 15, wherein the size of the indentation is substantially the same as the standard size of the threaded fastener.

21. The apparatus of claim 15, wherein the shape of the indentation is substantially the same as the standard shape of the threaded fastener.

22. The apparatus of claim 15, wherein the roundness of the head of the threaded fastener over the entire height thereof is M, the distance between the corner of the head of the threaded fastener and the corner of the head of the standard threaded fastener when the threaded fastener is mapped onto the standard threaded fastener is r, the distance between the corner of the standard threaded fastener and the edge of the incircle of the standard threaded fastener is X, and the following formula is satisfied:

$$M = r/X \times 100\%.$$

* * * * *